US012684520B2

(12) United States Patent
Hunukumbure et al.

(10) Patent No.: US 12,684,520 B2
(45) Date of Patent: Jul. 14, 2026

(54) LOCALISATION IN A TELECOMMUNICATION NETWORK

(71) Applicant: Samsung Electronics Co., Ltd., Suwon-si (KR)

(72) Inventors: Mythri Hunukumbure, Staines (GB); David Gutierrez Estevez, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 18/276,770

(22) PCT Filed: Feb. 17, 2022

(86) PCT No.: PCT/KR2022/002366
§ 371 (c)(1),
(2) Date: Aug. 10, 2023

(87) PCT Pub. No.: WO2022/177325
PCT Pub. Date: Aug. 25, 2022

(65) Prior Publication Data
US 2024/0137893 A1    Apr. 25, 2024
US 2024/0236913 A9    Jul. 11, 2024

(30) Foreign Application Priority Data
Feb. 17, 2021    (GB) ...................................... 2102239

(51) Int. Cl.
*H04W 64/00*        (2009.01)
*H04W 28/02*        (2009.01)

(52) U.S. Cl.
CPC ....... *H04W 64/00* (2013.01); *H04W 28/0268* (2013.01)

(58) Field of Classification Search
CPC .. H04W 28/0268; H04W 4/021; H04W 64/00
See application file for complete search history.

(56) References Cited

U.S. PATENT DOCUMENTS

| | | |
|---|---|---|
| 7,424,293 B2 | 9/2008 | Zhu |
| 8,242,959 B2 | 8/2012 | Mia et al. |
| 2010/0214992 A1 | 8/2010 | Hart et al. |
| 2011/0028165 A1* | 2/2011 | Ni .......................... H04W 4/02 455/456.2 |

(Continued)

FOREIGN PATENT DOCUMENTS

| | | |
|---|---|---|
| AU | 2008242924 A1 | 10/2008 |
| BR | PI0417246-9 A | 3/2007 |

(Continued)

OTHER PUBLICATIONS

3GPP, TSG SA; 5G System (5GS) Location Services (LCS); Stage 2 (Release 16), 3GPP TS 23.273 V16.5.0, Dec. 17, 2020.

(Continued)

*Primary Examiner* — Timothy X Pham
(74) *Attorney, Agent, or Firm* — Jefferson IP Law, LLP

(57) ABSTRACT

A method of performing localisation of a User Equipment, UE, in a telecommunication network is provided. The method comprises receiving from a second network entity a location request, and identifying multiple Quality of Service, (Continued)

QoS, class for location services comprising a plurality of QoS requirements based on the location request.

17 Claims, 9 Drawing Sheets

(56)                References Cited

U.S. PATENT DOCUMENTS

| | | | |
|---|---|---|---|
| 2020/0259896 A1 | 8/2020 | Sachs et al. | |
| 2021/0099870 A1 | 4/2021 | Moon et al. | |
| 2021/0266708 A1* | 8/2021 | Wang | H04W 28/10 |
| 2021/0273861 A1 | 9/2021 | Wang et al. | |
| 2023/0007556 A1* | 1/2023 | Qiao | H04W 36/322 |
| 2023/0209498 A1* | 6/2023 | Edge | H04W 64/003 |
| | | | 455/456.1 |

FOREIGN PATENT DOCUMENTS

| | | |
|---|---|---|
| CN | 108513726 A | 9/2018 |
| WO | 2020/173300 A1 | 9/2020 |
| WO | 2020/199935 A1 | 10/2020 |
| WO | 2021/066353 A1 | 4/2021 |

OTHER PUBLICATIONS

3GPP, TSG SA; Functional stage 2 description of Location Services (LCS) (Release 16), 3GPP TS 23.271 V16.0.0, Jul. 9, 2020.

3GPP, 3GPP TSG SA 5G System (5GS) Location Services (LCS) Stage 2 (Release 16), 3GPP TS 23.273 V16.3.0, Mar. 2020.

3GPP, 3GPP TSG SA System architecture for the 5G System (5GS) Stage 2 (Release 16), 3GPP TS 23.501 V16.7.0, Dec. 2020.

3GPP, 3GPP TSG SA Procedures for the 5G System (5GS) Stage 2 (Release 16), 3GPP TS 23.502 V16.7.0, Dec. 2020.

Examination Report and Notification of Intention to Grant dated Dec. 1, 2022, issued in United Kingdom Application No. GB2102239.7.

United Kingdom Search Report dated May 12, 2021, issued in United Kingdom Application No. GB2102239.7.

International Search Report and written opinion dated May 26, 2022, issued in International Application No. PCT/KR2022/002366.

* cited by examiner

[Fig. 1]
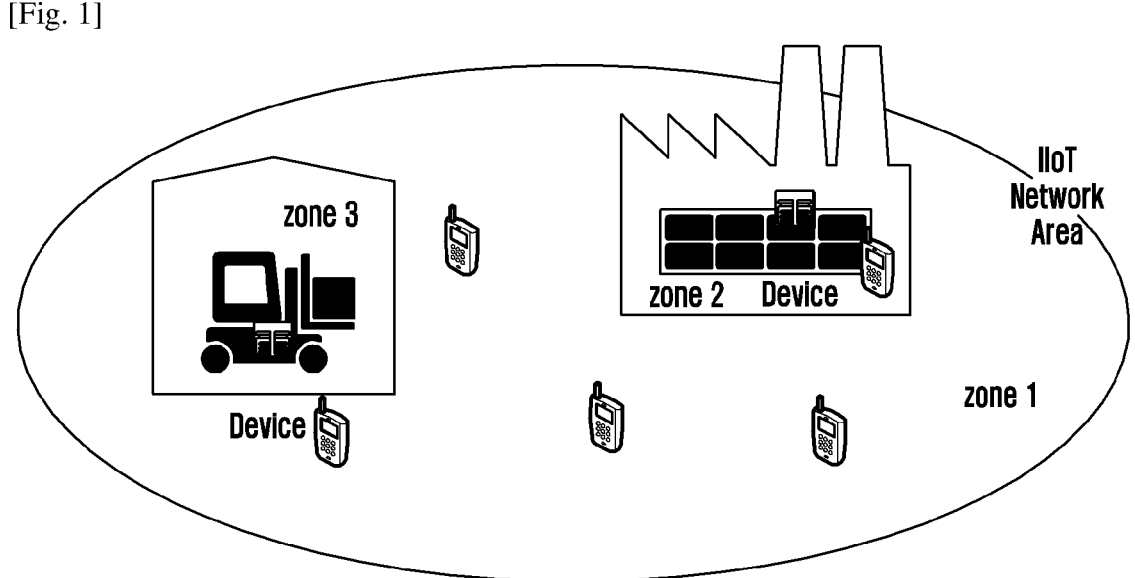

[Fig. 2]
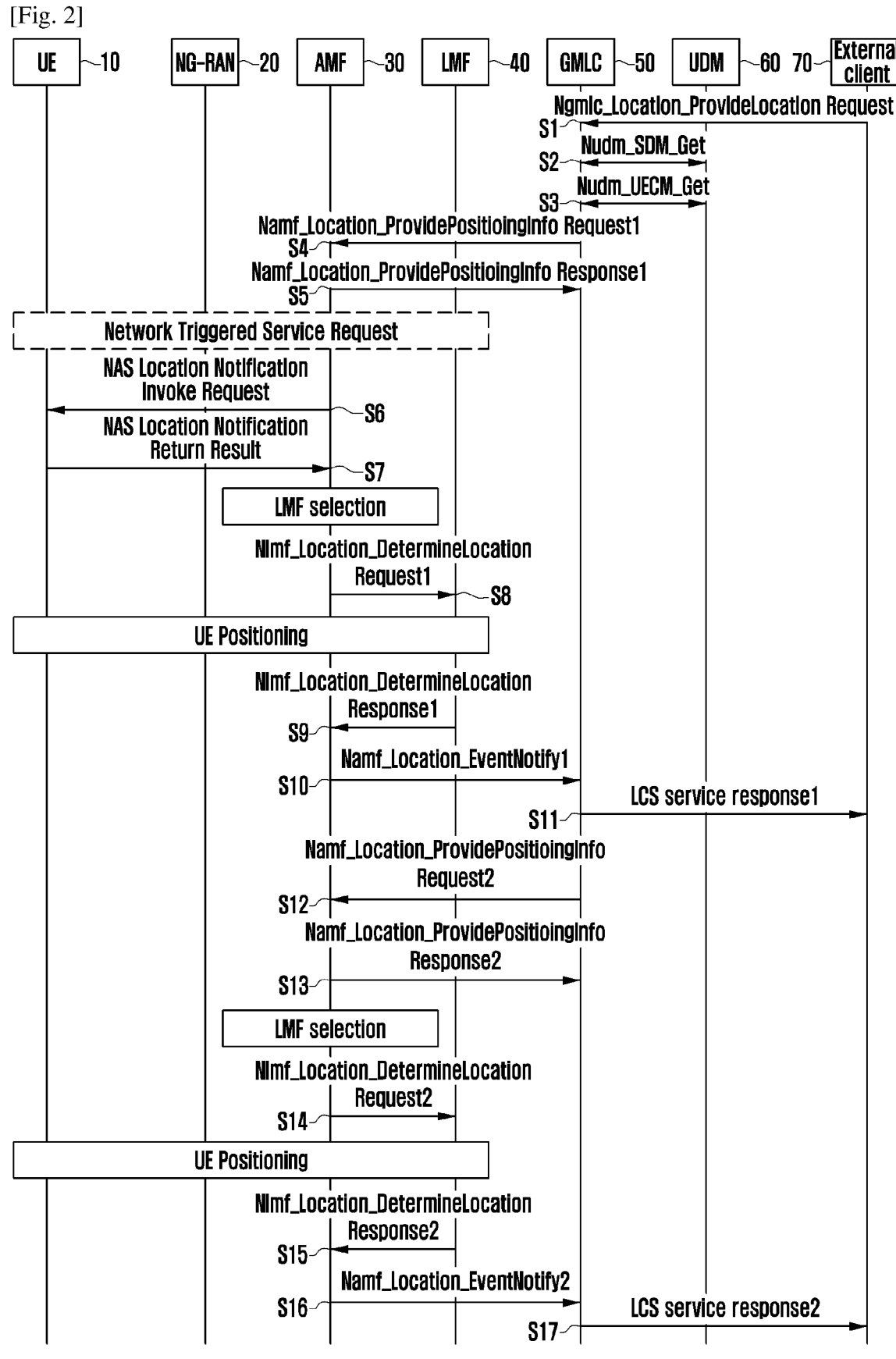

[Fig. 3]
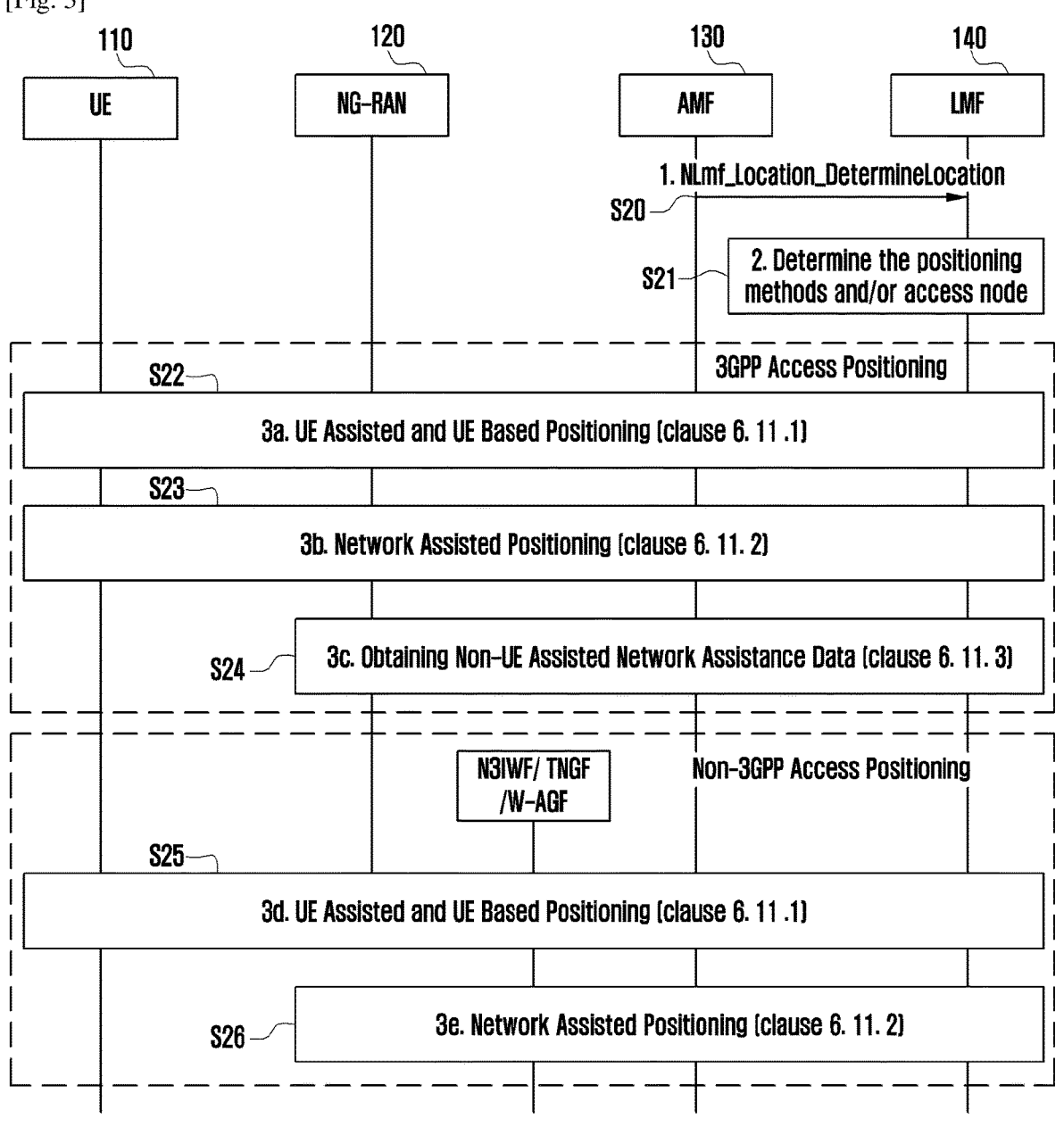

[Fig. 4]
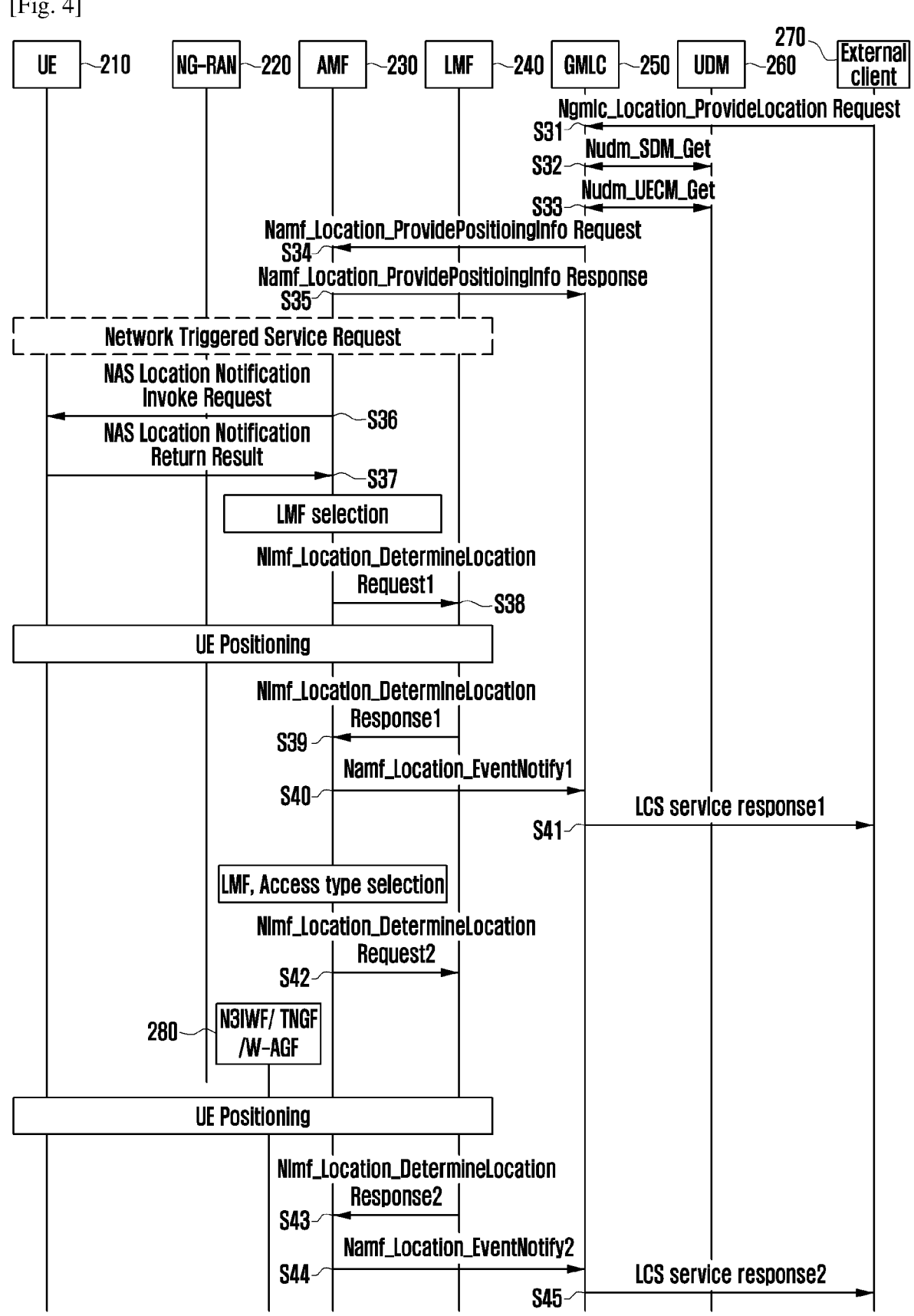

[Fig. 5]
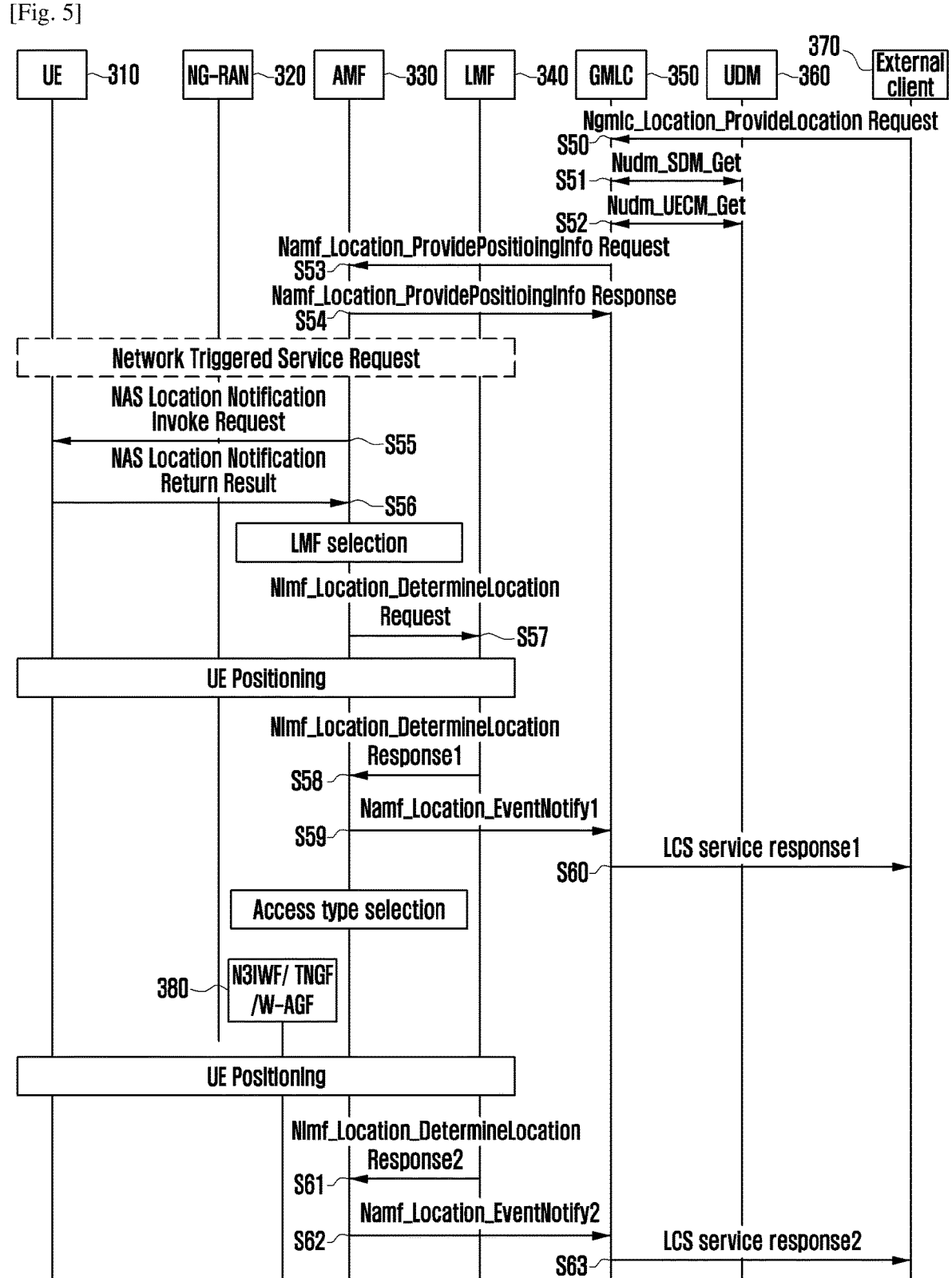

[Fig. 6]
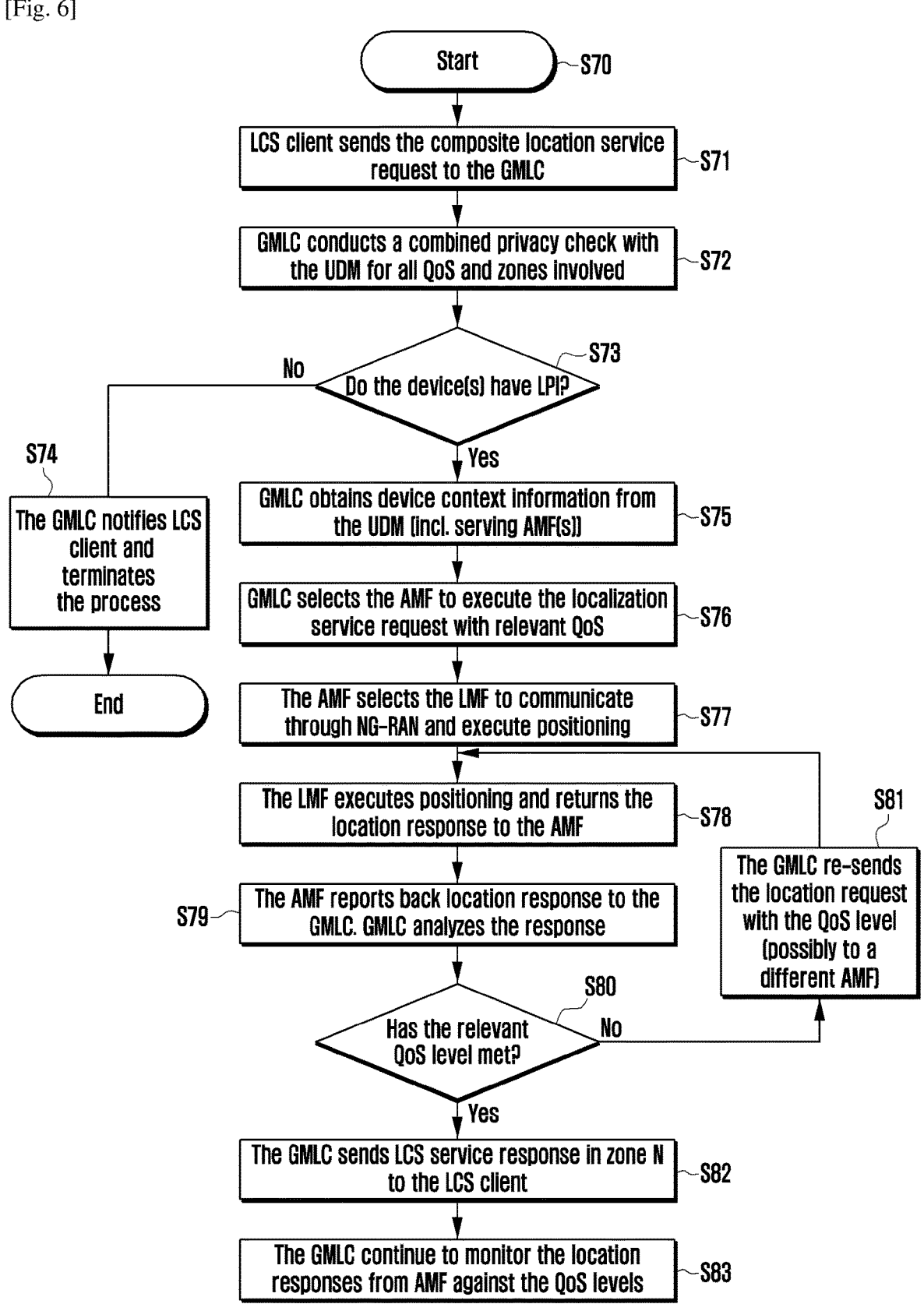

[Fig. 7]
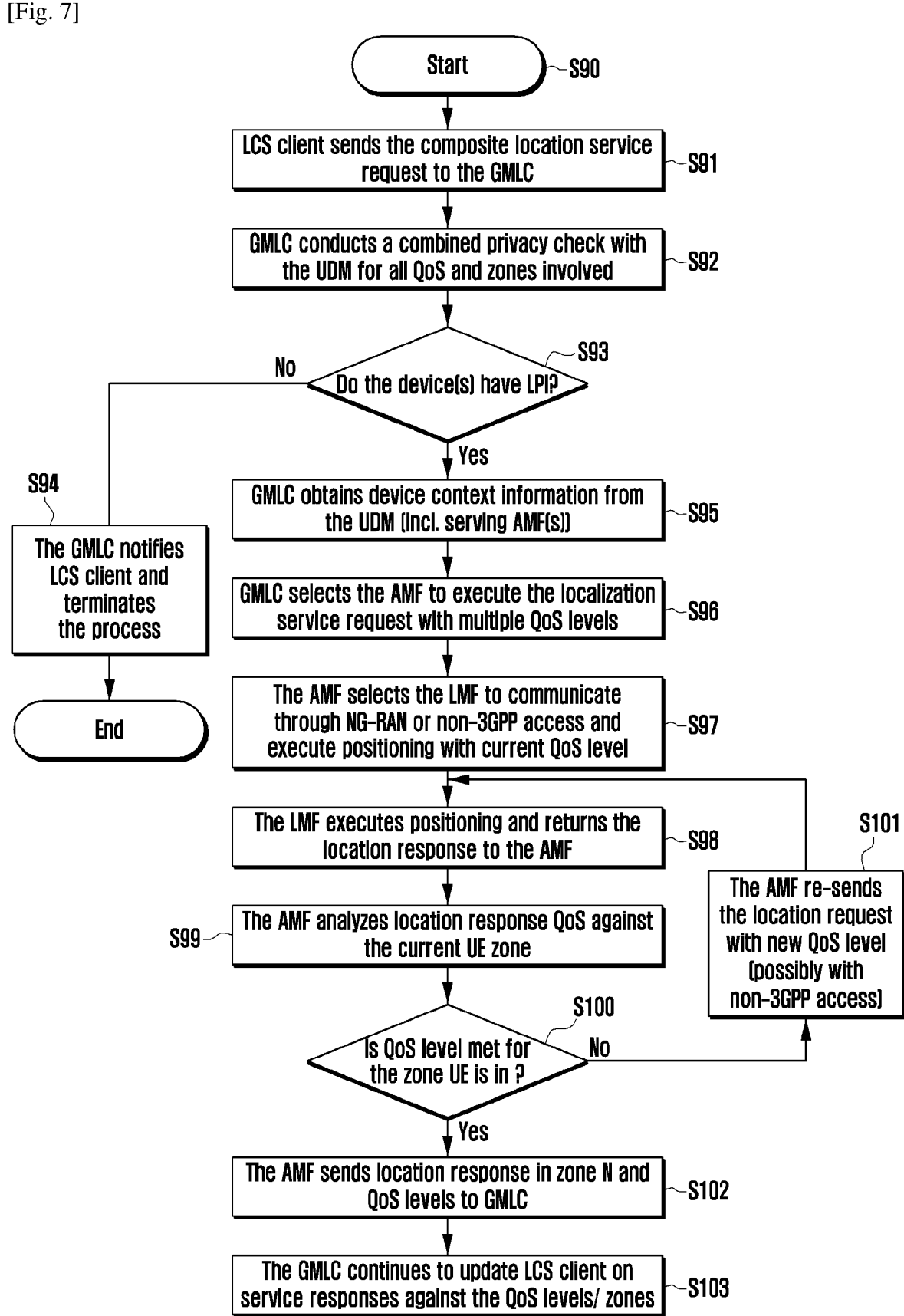

[Fig. 8]
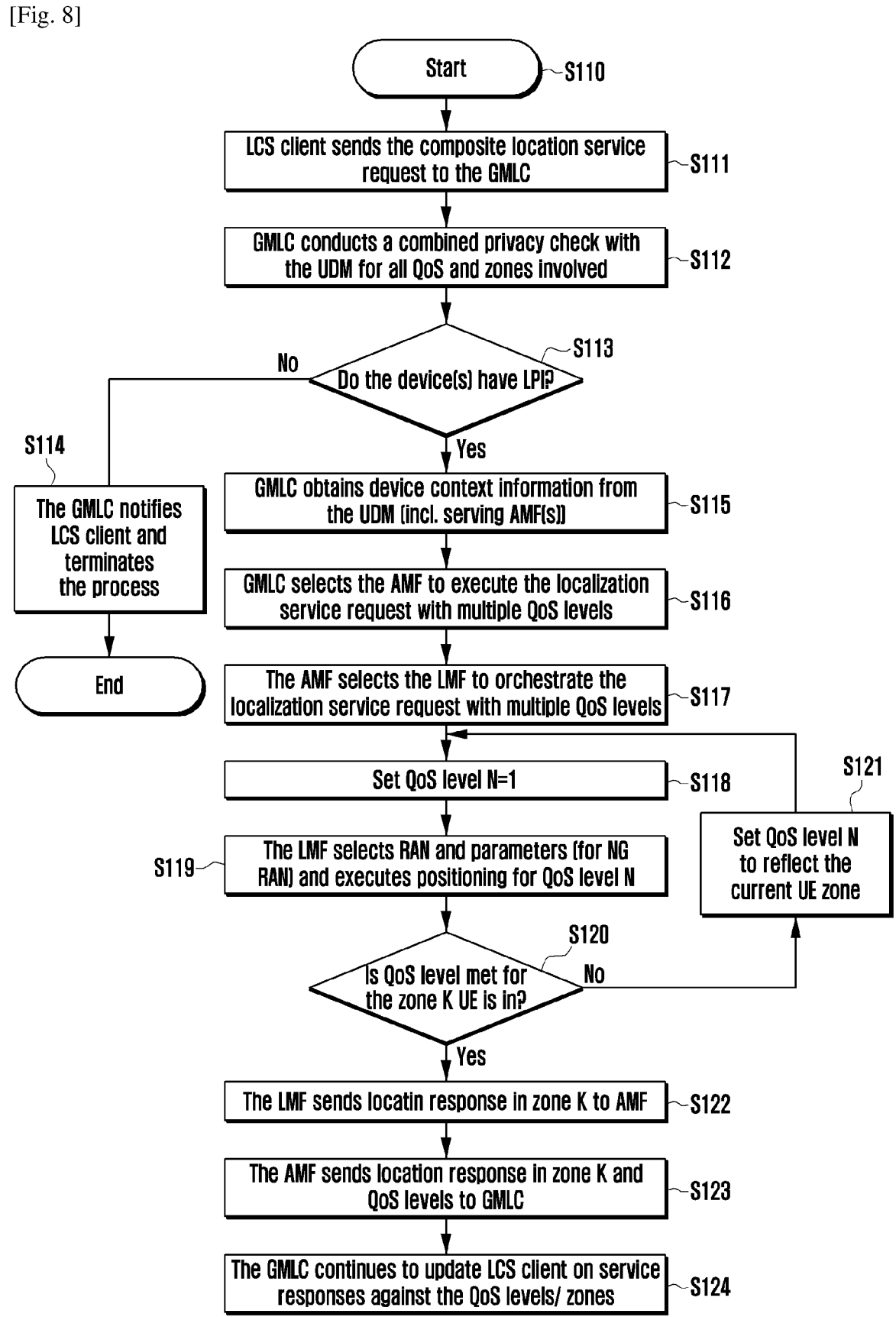

[Fig. 9]
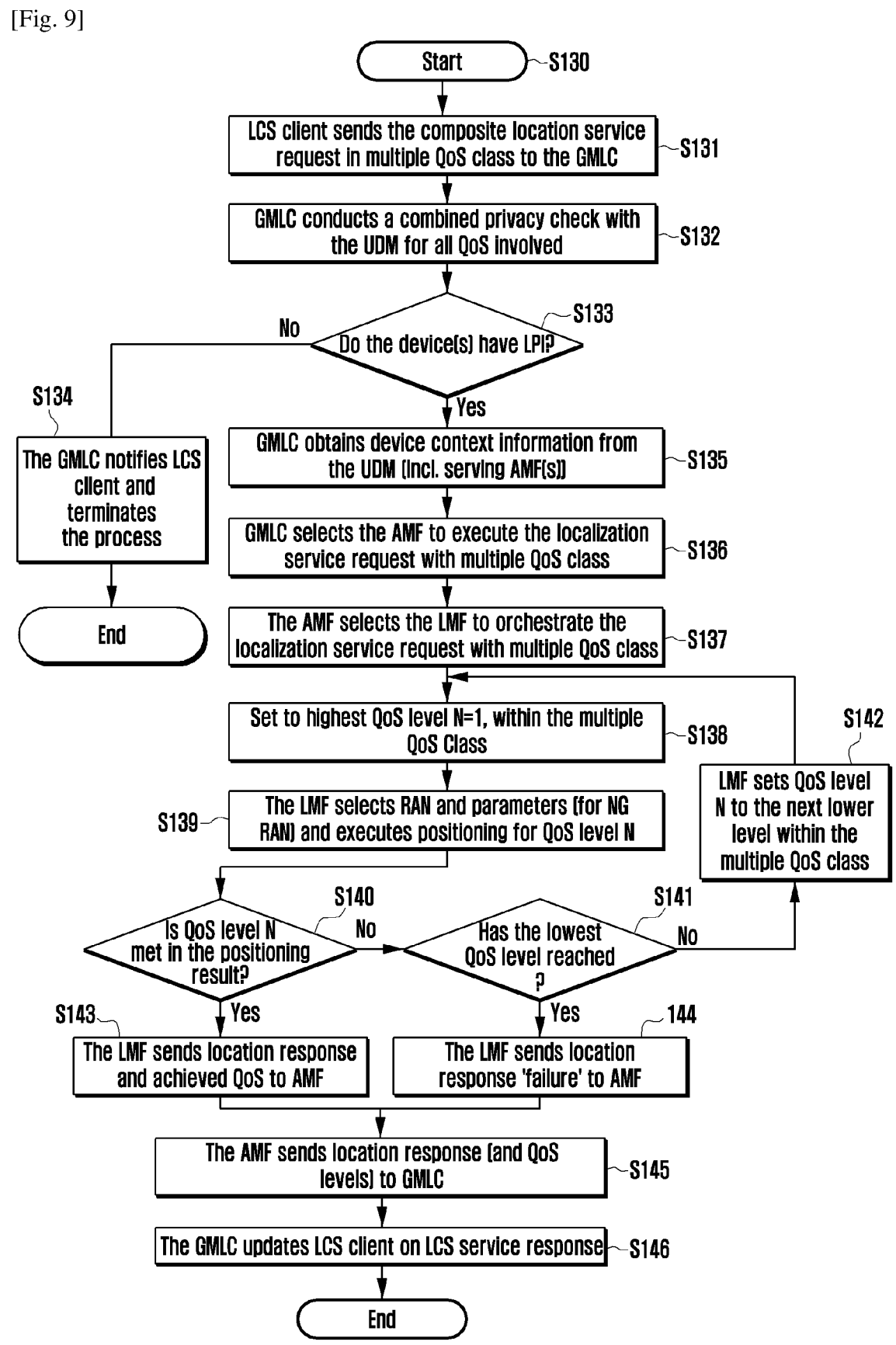

LOCALISATION IN A TELECOMMUNICATION NETWORK

TECHNICAL FIELD

The present disclosure relates to localisation i.e. determining to a given degree of accuracy, the position or location of a device within the coverage area of a telecommunication network.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

In such an environment, there may be multiple devices and it is desirable to be able to determine their respective positions relatively speedily and with a relatively high degree of accuracy.

Prior art localisation techniques may not be suitable to determine the respective location with sufficient speed and/or to the required degree of accuracy. Embodiments of the present disclosure aim to address issues with the prior art, whether mentioned herein or not.

DISCLOSURE OF INVENTION

Technical Problem

The present disclosure provides a method and apparatus for determining, to a given degree of accuracy, the position or location of a device within the coverage area of a wireless communication system.

Solution to Problem

According to the present disclosure there is provided an apparatus and method as set forth in the appended claims.

Other features of the disclosure will be apparent from the dependent claims, and the description which follows.

According to a first aspect of the disclosure, there is provided a method of performing localisation of a User Equipment, UE, or a device in a telecommunication network, comprising a step wherein a client sends a composite location service request to the telecommunication network, the composite location service request comprising a Quality of Service, QoS, class for location services comprising multiple sets of QoS requirements.

According to a second aspect of the disclosure, there is provided a telecommunication network arranged to perform the method of the first aspect.

Although a few preferred embodiments of the present disclosure have been shown and described, it will be appreciated by those skilled in the art that various changes and modifications might be made without departing from the scope of the disclosure, as defined in the appended claims.

Advantageous Effects of Invention

According to an embodiment of the present disclosure, the latencies involved with localization service messages can be reduced.

According to an embodiment of the present disclosure, localization can be performed on multiple QoS levels for different zones.

BRIEF DESCRIPTION OF DRAWINGS

For a better understanding of the disclosure, and to show how embodiments of the same may be carried into effect, reference will now be made, by way of example only, to the accompanying diagrammatic drawings in which:

FIG. 1 shows a representation of a zone-based localisation approach according to an embodiment of the present disclosure;

FIG. 2 shows an embodiment of the present disclosure in call flow form;

FIG. 3 shows an embodiment of the present disclosure in call flow form;

FIG. 4 shows an embodiment of the present disclosure in call flow form;

FIG. 5 shows an embodiment of the present disclosure in call flow form;

FIG. 6 shows a flowchart associated with embodiments of the present disclosure;

FIG. 7 shows an example of a flow chart associated with embodiments of the present disclosure;

FIG. 8 shows an example of a flow chart associated with embodiments of the present disclosure; and FIG. 9 shows a flowchart associated with a further embodiment of the present disclosure.

MODE FOR THE INVENTION

The device in question is herein termed a User Equipment and may relate to a handheld communication device such as a smartphone or similar but may equally apply to any device provided with suitable functionality. In a particular embodiment, the device in question is an item of industrial machinery, such as a robot, and the environment in which it operates is part of an Industrial Internet of Things (IIoT) network.

Embodiments of the disclosure provide a message call flow-based mechanism to reduce the latency in providing localisation services to requests containing multiple QoS levels for a given UE/device. In Industry IoT (IIoT) networks, such multiple QoS levels for the same device can occur when the device moves to another physical area (area zones), within specified time periods (time zones) or when the device density changes above a threshold (density zones).

In an embodiment, the class with multiple QoS requirements is a location QoS class and relates to:

a plurality of zones, with a QoS requirement associated with each of the plurality of zones; and/or a plurality of QoS requirements wherein if a location estimate obtained does not fulfil a most stringent QoS requirement, then the localisation estimate is repeated with a less stringent QoS requirement.

In an embodiment, the QoS class comprising multiple sets of QoS requirements comprises multiple triplets of values for Horizontal Accuracy, Vertical Accuracy and Response Time.

In an embodiment, a Gateway Mobile Location Centre, GMLC, within the telecommunication network obtains context information relating the UE and selects an Access and Mobility Management Function, AMF, to execute composite location service request with the multiple Quality of Service, QoS, class.

In an embodiment, the localisation is orchestrated by one of the GMLC, the AMF or a Location Management Function, LMF.

In an embodiment, the GMLC orchestrates the localisation, comprising the steps of the AMF selecting an LMF to perform localisation of the UE, and sending the localisation results from the LMF to the AMF and then onwards to GMLC.

In an embodiment, the GMLC analyses the localisation results to determine if the relevant QoS has been met in relation to a current zone and:

if not the GMLC re-sends the location request with the required QoS level to the same or a different AMF; or if met, the GMLC sends the response to the client and continues to monitor the location responses from the AMF against the QoS levels.

In an embodiment, the AMF orchestrates the localisation, comprising the step of the AMF selecting an LMF to communicate through NG-RAN or non-3GPP access and execute positioning with the current QoS level, and sending the location response to the AMF.

In an embodiment, the AMF analyses the location response QoS against a current UE zone and determines if the particular QoS level is met and:

if not, the AMF re-sends the location request with a new QoS level; or if met, the AMF sends the location response to the GMLC and the GMLC continues to update the client on service responses against the QoS classes/zones.

In an embodiment, the LMF orchestrates the localisation, comprising the step of the LMF selecting a RAN and parameters and executing positioning for QoS level N.

In an embodiment, the LMF determines if the QoS level is met for the zone in which the UE is located and:

if not, the QoS level is set to reflect the current UE zone; or if met, the LMF sends the location response for the current zone to the AMF and the AMF sends the location response to the GML and the GMLC continues to update the client on service response against the QoS levels/zones.

In an embodiment, multiple QoS level localisation operations are performed in the telecommunication network as a result of a single request wherein the LMF, AMF or GMLC, as appropriate, attempts to achieve the best possible QoS level in the Multiple QoS class and if the best possible QoS level is not returned in the location response, then the client enhances the location information provided by the telecommunication network on the basis of the QoS level provided and context information available to it regarding the physical layout of an environment in which the telecommunication network is located.

In an embodiment, the term zone defines one of:

a physical target area within the telecommunication network coverage area, where a specific QoS requirement in relation to localization must be met; and a time period or specific network condition associated with a certain threshold, such as a linear distance threshold, where the Multiple QoS class is applied.

According to an embodiment of the disclosure, systems are provided which are able to handle multiple QoS classes. In contrast, in the prior art (defined in TS 23.273 section 4.1b) there are two QoS classes, the "best effort" and "assured quality" classes. Embodiments of the disclosure introduce a new third class, herein called "Multiple QoS class".

In this application, the use of "Multiple QoS Class" is used to define a stringent requirement on the accuracy achieved for a location request but it may be used to relax the Assured Class requirements known in the prior art. "Multiple QoS Class", as defined herein, allows multiple values of each QoS requirement (i.e. Accuracy and Response Time) to be provided in the location request as LCS Quality of Service information. When used in a MT-LR or deferred location request for periodic location, if a location estimate obtained does not fulfil the most stringent QoS values, then the location estimate is repeated with the next less stringent QoS values. When used in a deferred location request with an area event and multiple target areas, each QoS requirement (i.e. Accuracy and Response Time) can be mapped to one target area. If the least stringent QoS requirement values cannot be fulfilled by a location estimate, then the location estimate shall be discarded, and an appropriate error cause shall be sent.

Throughout this application, "Multiple QoS class" is defined as a new QoS class, which can operate alongside the two localization QoS classes known in the prior art: the Assured QoS class and the Best effort QoS class. The use of the term "class" in relation to QoS refers to one or more requirements or levels associated with that class. The term "Multiple QoS class" contains multiple different requirements, which may be either a particular QoS requirement associated with one or multiple areas or an iterative approach whereby if a first level or requirement may not be met, then a second or further level or requirement is assessed. This continues until either level or requirement is satisfied, in which case the location is reported or, if the minimum QoS level or requirement is reached and not satisfied, then an error is reported.

In the latter case, this is similar to the "assured quality" class known in the prior art where it is not possible to satisfy the given requirement.

A benefit of an embodiment of the present disclosure is that is provides enhanced functionality and requires only a minimal change to the technical standards. In particular, in section 4.3.3 of TS 23.273, under "additional functions the GMLC may perform", there is included: "At an HGMLC, determine whether to attempt a second location request for a target UE from a different AMF when location information returned by a first AMF does not meet QoS requirements and there is more than one serving AMF".

This passage implies that the GMLC is capable of inspecting the QoS levels of a returned location information from an AMF and re-issuing a location request, if the returned location information does not meet the criterion. According to an embodiment of the present disclosure, there is provided an upgraded functionality to the (H)GMLC, to support location requests with multiple QoS classes. Under "additional functionalities for the GMLC, the TS 23.273 (section 4.3.3) includes: "At an HGMLC, support location requests from an external LCS client or NEF for a 5GC-MT-LR and deferred 5GC-MT-LR for periodic, triggered and UE available location events."

As a result of implementation of an embodiment of the present disclosure, this may be reformulated to substantially read: "At an HGMLC, support location requests, including requests with multiple QoS classes, from an external LCS client or NEF for a 5GC-MT-LR and deferred 5GC-MT-LR for periodic, triggered and UE available location events." In this passage, the additional expression "including requests with multiple QoS classes" is included which relates to the operation of embodiments of the present disclosure.

Embodiments of the disclosure are focused on situations where the IIoT network can have different 'zones' and the UEs/devices/sensors that need to be localized within the IIoT network will move between these different zones. The zones referred to herein are can take several forms and need not only be physical areas as per the normal use of the term "zone". "Zone" can also refer to a period of time and a measure of the density of devices in a given area or location.

Also, the Quality of Service (QoS) for the localization result (the accuracy, latency and update rate for example) will change depending in the zone a particular device is in. The default service message flow method to address this situation is for the external localization client (or the AF/NF) to issue event-based localization requests with the appropriate QoS level to the Gateway Mobile Location Centre (GMLC) as the device(s) enter the different zones. Embodiments of the disclosure, provide for the Localization Services (LCS) client (or the AF/NF) to issue a compound localization request with the different zones and associated multiple QoS levels to the GMLC at the start and the GMLC to coordinate the localization process as per the relevant QoS levels depending on the device movements. This reduces the number of messages and the privacy verification checks that need to be performed and hence will reduce the end-to-end latency levels of the localization process.

The reduction in service message flow associated latency arises from the fact that the Gateway Mobile Location Centre (GMLC) handles the multiple QoS levels and directs the Access and Mobility Management Function (AMF(s)) to carry out the localisations accordingly or when the AMF directly handles the multiple QoS levels and selects the Location Management Function (LMF) and, possibly, different access types to execute the localization.

Embodiments of the disclosure reduce the latencies involved with localization service messages, so that the overall end-to-end latencies are reduced. Some Industry IoT applications have very strict end-to-end latency requirements (in the order of 1 ms), and embodiments of the disclosure assist in meeting this goal.

Embodiments of the disclosure are useful in situations where, in Industry IoT networks, localization needs to be performed on multiple QoS levels for different zones. These zones could be physically different areas such as inside a factory, a warehouse or outside in a yard where goods are moved about. These areas can have different localization QoS requirements. Alternatively, the different zones may be time dependent zones. Within a given time period, the devices need to localized to a higher QoS level, for example. Still further, the device localization QoS level can be dependent on device density. For example, when the number of devices in a specific area goes beyond a certain number, the localization may need to have a higher accuracy, to mitigate erroneous device identification. Also, a common requirement in many localization requests for IIoT scenarios is to achieve low latency and this requirement will be similar in all the above scenarios. A typical physical area based zone depiction is shown in FIG. 1, where three distinct zones (1, 2 and 3) are shown which may have different localization QoS requirements.

In the prior art, a common service message path for multiple QoS level Localization requests is for the LCS client (or the AF/NF) to manage these QoS levels. The LCS client will request a localization service for a single QoS to the correct (or best known) zone parameter from the network. The GMLC will handle this single QoS request with a privacy check for the devices/UEs with the Unified Data Management (UDM) and will provide the localization response after orchestrating the localization related network functions (AMF, LMF). The LCS client will continue to accept these responses from the GMLC until the localization-related QoS levels change. Then the LCS will issue a new localization request to indicate the new QoS level for a particular device (or a group of devices). The GMLC will have to repeat the same process with new privacy indication checks for this new request from the LCS client. This prior art process incurs latency delays due to the repetitive steps in the service message flow. Embodiments of the present disclosure aim to minimize these repetitive steps and thus reduce the end-to-end latencies.

The problem set out above considers a MT-LR (Mobile Terminated Location Request), coming from a network function (AF or NF) or from an external LCS client as part of a commercial service. The default call flow for such MT-LR are depicted in Figure 6.1.2-1 of TS23.273 (not reproduced here, but incorporated by reference). In this, the call flow is depicted for a roaming service, with a Home GMLC (HGMLC) and a Visited GMLC (VGMLC) but can be easily interpreted for a non-roaming service, without this separation of the GMLC. If this specified call flow is applied to the above scenario of different zones, the LCS client could request a location service only for a single QoS value, assuming the current zone(s) of the device or the group of devices. Then the GMLC would carry out a privacy check with the UDM and also obtain the context information (including serving AMF) for the device(s). The GMLC will then orchestrate the AMF and onwards LMF to obtain the location information for the provided QoS level and check if the stated QoS levels are met in the provided positioning response. If so, the GMLC will then provide the LCS service response to the LCS client (or AF/NF). The LCS client (or AF/NF) will check the current location of the device(s) and when the required QoS level for this zone (if the zones are defined per area) is higher, will issue another location request with the higher QoS level. Generally, as the device (s) move from one zone to another, the LCS client (or AF/NF) will have to issue new location requests and the GMLC will have to execute the above call flow steps for each of the location requests. For obtaining continual location updates for a device(s) with low latency, this repetition of steps poses a significant barrier.

According to an embodiment of the present disclosure, depicted in call flow format in FIG. 2, the GMLC 50 is arranged to first accept a combined location service request (S1) from the LCS client 70 (or AF/NF) with multiple QoS. The combined request will contain the denomination of different zones and the relevant QoS levels needed for each zone. The GMLC 50 will contact (S2, S3) the UDM 60 and carry out a privacy verification for all the zones and QoS levels involved in the request.

The GMLC 50 will then select the correct AMF 30 to execute the request as per the current QoS level. The AMF 30 will drive the positioning steps through selecting a correct LMF 40 and the LMF 40 will configure the NG-RAN parameters to obtain the localisation with the required QoS (or even select another non-3GPP RAN if necessary). The results will be notified from LMF 40 to AMF 30 (S9) and then onwards (S10) to GMLC 50. At this stage the GMLC 50 will check the current location against the required QoS level and if this is met, the results will be notified to the LCS 70 client (S11).

If the QoS levels are not met, the GMLC 50 will perform another request (S12) to the AMF 30 to meet the QoS levels for the device's current zone. The GMLC 50 will continually check the QoS level against the reported (or indicated) zone for the device and will decide if to notify the LCS client 70 or make a new request to the AMF 30. In this way, the GMLC 50 is controlling the execution of the composite location request. As the number of call flow steps and the privacy checks are limited in this GMLC driven MT-LR solution, when compared to prior art solutions, the overall latencies for localization are reduced.

FIGS. 2 to 5 show call flows associated with different embodiments of the disclosure. The basic network topology is the same in each case, but the nature of the call flows differs. The numbering of the network elements is consistent and descriptions of the various entities (e.g. AMF 30, 130, 230, 330) is not necessarily repeated, for brevity.

A call flow associated with a first embodiment is presented in FIG. 2. It illustrates two positioning requests labelled "UE Positioning", based on two zones for the device, but this can be easily extended to N number of requests and zones.

For very large IIoT networks with potentially thousands of devices, it may be feasible to employ two or more AMFs 30 which can cover different geographic areas of the network. In this scenario, especially if the above stated zones are defined as geographic areas (as opposed to time or density-based zones), the GMLC 50 can re-select the correct AMF 30 if a change in the zones occurs. Again, in this case, the GMLC 50 will only pass on the location notifications to the LCS 70 client if the correct QoS levels are met in the location result. If not, the GMLC 50 will re-issue a location request, with the possible change of the AMF 30. It is worth noting that, depending on the QoS levels and UE state, the AMF 30 can have the option to select non-3GPP access as well. For example, it is known that with Ultra Wideband (UWB) technology, localization accuracies in the range of 10 cm can be achieved, which is an enhancement from 3GPP based technologies. Also, if the UE is in (3GPP) idle state, the AMF 30 can select WiFi, for example, to do the positioning, which removes the need to bring the UE into the RRC-connected state.

In a second embodiment, the composite LCS request is orchestrated via the AMF. This embodiment is illustrated in FIG. 3.

The AMF 130 (and also the LMF 140) has the option to specify the radio access type used to derive the location information, as long as this access type is configured as a trusted, untrusted or wireline access type for the PLMN core and the UE 110 has indicated its capability to use this access type. A specific call flow is shown in FIG. 3, illustrating the steps in a 3GPP Access positioning operation (S22-S24) and a Non-3GPP Access positioning operation (S25-S26).

This embodiment is particularly useful when the non-3GPP technologies can provide better QoS in positioning than the 3GPP methods. For example, UWB technology is known to provide very high location accuracies (in the order of 10 cm) for short range communications.

In the Industry IoT scenario, for example, the positioning of articles on a conveyor belt would require such accuracies, while away from this arena, the accuracies provided by 3GPP techniques would suffice. The AMF 130 could execute the localisation by selecting different access technologies to meet the different QoS levels in this instance and instructing the LMF 140 to use the new access type and obtain the new QoS level. Alternatively, the AMF 130 could simply update the new QoS level requirement to the LMF 140 and the LMF 140 can select the appropriate access technology. The access type selection capability is already is known in the prior art.

A call flow diagram for the execution of this embodiment, with the option to select a non-3GPP access technology is shown in FIG. 4. Many of the calls/messages in this embodiment are the same as those shown in FIG. 2 and so commentary on these is omitted for brevity.

The composite localisation request comes from the LCS client 270 to the GMLC 250. The GMLC 250 selects the appropriate AMF capable of deriving the different QoS levels and sends the composite request (S34) as 'Namf_Location_provide positioningInfo request' to the AMF 230. The AMF makes a decision on the current zone for the UE 210 and selects an LMF 240 and the access type to derive the localisation to match the necessary QoS level for this zone.

In FIG. 4, the first "determine location" (S38) request to the LMF 240 is driven by 3GPP access. When the location response comes back (S39) from the LMF 240, the AMF 230 checks the QoS level and if this meets the requirements, the response is sent onwards (S40) to the GMLC 250 and to the LCS client 270 (S41). When the UE 210 moves on to the second zone, the AMF 230 detects this and can select an LMF 240 (can also be the LMF in the first instance) to derive the new QoS levels by localising through a new non-3GPP access mode. The LMF 240 drives this localisation process either through the N3IWF, TNGF or W-AGF functions 280. This could also include a UWB interworking function that could be adopted by 3GPP in the future. The AMF 230 again checks if the localisation response meets the new QoS level and if it does, the AMF 230 sends the response onwards to the GMLC 250 (S44) and then onwards to the LCS client 270 (S45).

As the decisions on the respective QoS levels and the LMF 240 and access mode are all made by the AMF 230, the number of messages needed to enact this solution is fewer than for the GMLC based solution shown in FIG. 2 and, hence, this can be executed even faster.

The AMF functionalities (as per the localisation service requests) are contained in TS 23.273, section 4.3.7, which includes:

"Functions which may be performed by an AMF to support location services include the following:

Receive and manage location requests from a GMLC for a 5GC-MT-LR and deferred 5GC-MT-LR for periodic, triggered and UE available location events."

Therefore, if the GMLC additionally supports localization requests with multiple QoS levels as set out previously, this would imply that the AMF in turn will have to support this if the GMLC decides to forward this composite location request to the AMF. Therefore, provided that the additional functionality for the GMLC is enacted, the AMF does not need further specification updates to implement this functionality.

FIG. 5 shows a still further embodiment where, in an extension of the process shown in FIG. 4, the LMF 340 can also drive the composite LCS 370 request. The AMF 330 will forward (S57) the multiple QoS level localisation request to the LMF 340. The LMF 340 will decide on the access type and other RAN configuration parameters (if the access type is NG-RAN 320) and orchestrate the UE 310 positioning. When it receives the localization results, LMF 340 will check the QoS levels and if it matches to the given zone (for example a physical area) then it will forward (S58) the results to the AMF 330 and the AMF 330 will forward (S59) the results to GMLC 350 (and onwards to LCS client 370) (S60). If QoS levels are not met, the LMF 340 can reconfigure the RAN parameters or change the access type. When the LMF 340 detects that the QoS level needs changing, it can select another access type, such as WLAN or UWB access for very accurate positioning. If NG-RAN 320 is selected for access type, it will configure RAN parameters related to localization (like the PRS/SRS signal repetition rate, for example) to help meet the new QoS level. When the localization results are derived, it will again check the QoS levels and follow the same steps as above (S61-S63).

FIG. 6 is a flowchart which illustrates certain steps associated with the GMLC-driven embodiment shown in FIG. 2.

Flow starts at S70. At S71, the LCS client 70 sends a composite location service request to the GMLC 50. At S72. The GMLC 50 conducts a combined privacy check with the UDM 60 for all QoS zones (physical or otherwise) involved with the request.

At S73, a determination is made whether the devices in question have Location Privacy Information (LPI). If not, then at S74, the GMLC 50 notifies the client 70 and terminates the process, since it cannot continue with this determination.

Alternatively, flow continues to S75 where GMLC 50 obtains device context information from the UDM 60, which includes details of the serving AMF(s) 30.

At S76, the GMLC 50 selects the AMF 30 to execute the localisation service request with the relevant QoS.

At S77, the AMF 30 selects the LMF 40 to communicate through NG-RAN 20 and executes the positioning operation.

At S78, the LMF 40 executes the positioning operation and returns the location response to the AMF 30.

At S79, the AMF 30 reports the localisation response back to the GMLC 50 and the GML 50 analyses the response.

At 580, the GML determines if the relevant QoS level has been met. If not, flow passes to S81 where the GMLS re-sends the location request with the QoS level. This may be sent to a different AMF 30 to the previous one. Flow then passes to S77 again.

If at 580, the GMLC 50 determines that the relevant QoS level has been met, then, at S82, the GMLC 50 sends the LCS service response for the particular zone (N) to the LCS client 70.

At S83, the GMLS 50 continues to monitor the location response from the AMF 30 against the QoS levels.

By studying FIGS. 2 and 6 together, a complete impression of the operation of this embodiment of the disclosure can be obtained.

FIG. 7 is a flowchart which illustrates certain steps associated with the AMF-driven embodiment shown in FIG. 4.

Flow starts at 590. At 591, the LCS client 270 sends a composite location service request to the GMLC 250. At S92. The GMLC 250 conducts a combined privacy check with the UDM 260 for all QoS classes and associated zones (physical or otherwise) involved with the request.

At S93, a determination is made whether the devices in question have Location Privacy Information (LPI). If not, then at S94, the GMLC 250 notifies the client 270 and terminates the process, since it cannot continue with this determination.

Alternatively, flow continues to S95 where GMLC 250 obtains device context information from the UDM 260, which includes details of the serving AMF(s) 230.

At S96, the GMLC 250 selects the AMF 230 to execute the localisation service request with the relevant QoS.

At S97, the AMF 230 selects the LMF 240 to communicate through NG-RAN 220 or non-3GPP access and executes the positioning operation.

At S98, the LMF 240 executes the positioning operation and returns the location response to the AMF 230.

At S99, the AMF 230 analyses the location response QoS against the current UE zone.

At S100, the AMF determines if the UE 210 requires a new QoS level for the zone in which it is currently residing. If yes, flow passes to S101 where the AMF 230 re-sends the location request with new QoS level. This may involve non-3GPP access. Then, flow passes back to S98.

If, at S100, the AMF 230 determines that the UE 210 is not in a new QoS zone and the QoS level is met, then flow passes to S102, where the AMF 230 sends a location response in zone N and QoS levels to the GMLC 250.

At S103, the GMLC continues to update the LCS client 270 on service response against the QoS levels/zones.

By studying FIGS. 4 and 7 together, a complete impression of the operation of this embodiment of the disclosure can be obtained.

FIG. 8 is a flowchart which illustrates certain steps associated with the LMF-driven embodiment shown in FIG. 5.

Flow starts at S110. At S111, the LCS client 370 sends a composite location service request to the GMLC 350. At S112. The GMLC 350 conducts a combined privacy check with the UDM 360 for all QoS zones (physical or otherwise) involved with the request.

At S113, a determination is made whether the devices in question have Location Privacy Information (LPI). If not, then at S114, the GMLC 350 notifies the client 370 and terminates the process, since it cannot continue with this determination.

Alternatively, flow continues to S115 where GMLC 350 obtains device context information from the UDM 360, which includes details of the serving AMF(s) 330.

At S116, the GMLC 350 selects the AMF 330 to execute the localisation service request with the relevant multiple QoS.

At S117, the AMF 330 selects the LMF 340 to orchestrate the localisation service requests with multiple QoS levels.

At S118, QoS level, N=1, is set.

At S119, the LMF 340 selects RAN and parameters for NG-RAN and executes positioning for QoS level N.

At S120 a determination is made by the LMF of whether the QoS level is met for the zone (k) in which the UE 310 is located. If the determination is "no", the flow passes to S121 where the QoS level N is set to reflect the current zone and flow proceeds to S119.

If, at S120, the determination is "yes", then at S122, the LMF 340 sends the location response in zone k to AMF 330.

At S123, the AMF 330 sends the location response in zone k and QoS levels to GMLC 350.

At S124, the GMLC 350 continues to update the LCS client 370 on service responses against the QoS levels/zones.

By studying FIGS. 5 and 8 together, a complete impression of the operation of this embodiment of the disclosure can be obtained.

FIG. 9 shows a flowchart associated with a further embodiment of the present disclosure. This embodiment relates to the case where an iterative approach is applied, whereby successive attempts are made to meet the QoS requirements specified. This differs from the previous embodiments which define different QoS requirements for different zones (physical or otherwise).

The flowchart of FIG. 9 relates to the case where the LMF orchestrates the operation and so is closely related to FIG. 5. However, a very similar approach is taken regardless of whether the LMF, AMF or GMLC orchestrates the positioning operation and other embodiments using the same iterative process will be apparent to the skilled person.

Flow starts at S130. At S131 the LCS client 370 sends the composite location service request to the GMLC 350. The request is a Multiple QoS class.

At S132, the GMLC 350 conducts a combined privacy check with the UDM 360 for all QoS included in the message.

At S133 a determination is made if the UE or device 310 has LPI. If not, then the GMLC 350 notifies the client 370 and the process is terminated. If the device 310 does have LPI, then flow continues to S135, where the GMLC 350 obtains device context information from the UDN 360, which includes details of the serving AMF(s) 330.

At S136, the GMLC 350 selects the AMF 330 to execute the localisation service request with multiple QoS class.

At S137, the AMF 330 selects the LMF 340 to orchestrate the localisation service request with multiple QoS class. When used herein the term orchestrate includes the selection of one of multiple specified QoS requirements.

At S138 the QoS level N is set to 1 (the highest) within the multiple QoS class.

At S139, the LMF 340 selects RAN 320 and parameters (for NG-RAN) and executes positioning for QoS level N.

At S140, a determination is made if QoS level N is met in the positioning result. If so, flow passes to S143 where the LMF 340 sends the location response to the AMF 330. However, if the QoS level is not met, then flow passes to S141 where it is determined if the lowest QoS level has been reached. If so, flow passes to S144 where the LMF 340 sends a location response failure message to the AMF 330.

However, if the lowest QoS level has not been reached, then flow passes to S142, where the QoS level N is decremented (i.e. reduced to the next lower level within the multiple QoS class) and flow returns to S139.

After S143 or S144, depending on the localisation result, flow passes to S145 where the AMF 330 sends the location response and associated QoS levels to GMLC 350.

At S146, the GMLC 146 updates the client 370 on the service response and flow terminates.

In a further refinement of all the embodiments so far presented, the location information provided to the LCS client can be enhanced. In many situations, the location processor (or LCS client (70, 170, 270, 370) can apply context information to increase the accuracy of the estimate provided. But this requires extra time and processing. For an indoor example, the location processor can be provided with maps of the building floor layout and can apply this knowledge to reduce some of error in a location estimate for an indoor UE/device (10, 110, 210, 310).

For a multiple QoS class request, if the LMF (40, 140, 240, 340) can provide the highest accuracy, this context information need not be applied. This saves time and processing effort. However, if the LMF provides a location with a reduced accuracy, then this post-processing can be applied at the LCS client. In both situations, the use of the multiple QoS class helps to derive the location result with a single interaction with the 5GC and 5G-RAN (or non-3GPP RAN), thereby reducing latency and improving performance.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a first network entity in a wireless communication system, the method comprising:
   receiving, from a second network entity, a location request; and
   identifying that a quality of service (QoS) class of location services is set to a multiple QoS class based on the location request,
   wherein the multiple QoS class is related to a plurality of QoS requirements, and
   wherein a location estimate is iterated until one of the plurality of QoS requirements related to the multiple QoS class is fulfilled, starting with a most stringent QoS requirement.

2. The method of claim 1, further comprising:
   identifying whether a first location estimate fulfils the most stringent QoS requirement among the plurality of QoS requirements,
   wherein, in case that the first location estimate does not fulfil the most stringent QoS requirement, a second location estimate is triggered for a less stringent QoS requirement.

3. The method of claim 1, wherein multiple values for horizontal accuracy and vertical accuracy are provided in the location request based on the multiple QoS class.

4. The method of claim 1, further comprising:
   performing a procedure for user equipment (UE) positioning,
   wherein the first network entity operates a location management function (LMF) and the second network entity operates access and mobility management function (AMF).

5. The method of claim 4,
   wherein performing of the procedure for the UE positioning comprises:
   selecting parameters related to the UE positioning with a required QoS level; and
   executing the UE positioning for the required QoS level.

6. The method of claim 5, further comprising:
   determining whether the required QoS level is met for a zone in which the UE is located,
   wherein, in case that the required QoS level is not met, the required QoS level is set to reflect a current UE zone, and
   wherein, in case that the required QoS level is met, the first network entity operating the LMF sends a location response for the current UE zone to the second network entity operating the AMF.

7. The method of claim 1,
   wherein the first network entity operates a gateway mobile location centre (GMLC).

8. The method of claim 7, further comprising:
   obtaining context information for a user equipment (UE); and
   selecting an access and mobility management function (AMF), to execute the location request with the multiple QoS class.

9. The method of claim 8, further comprising:

receiving localisation results from the AMF.

10. The method of claim 9, further comprising:

analyzing the localisation results to determine if a relevant QoS has been met in relation to a current zone; and if the relevant QoS has not been met, re-sending the location request with a required QoS level to the same or a different AMF; or if the relevant QoS has been met, sending a response to the second network entity and monitoring continuously location responses from the AMF against QoS levels.

11. The method of claim 1, wherein the first network entity operates an access and mobility management function (AMF).

12. The method of claim 11, further comprising:

selecting a location management function (LMF) to communicate through a next generation radio access network (NG-RAN) or non-third generation partnership project (non-3GPP) access and execute positioning with a current QoS level; and receiving, from the LMF, a location response.

13. The method of claim 12, further comprising:

analyzing a location response QoS against a current UE zone;

determining if a particular QoS level is met; and if the particular QoS level is not met, re-sending the location request with a new QoS level; or if the particular QoS level is met, sending the location response to the second network entity operating a gateway mobile location centre (GMLC).

14. The method of claim 11, further comprising: selecting a location management function (LMF) to perform localisation of the UE;

receiving, from the LMF, localisation results; and transmitting the localisation results to the second network entity operating a gateway mobile location centre (GMLC).

15. The method of claim 1, wherein multiple QoS level localisation operations are performed as a result of a single request.

16. The method of claim 1, further comprising:

in case that a minimum QoS requirement among the plurality of QoS requirements is not fulfilled, transmitting, to the second network entity, information indicating an error.

17. The method of claim 1, wherein the QoS class of location services is set to the multiple QoS class among three QoS classes of location services, and wherein the three QoS classes of location services include a best effort class, an assured class, and the multiple QoS class.

* * * * *